United States Patent
Merchant et al.

(10) Patent No.: US 7,577,996 B1
(45) Date of Patent: Aug. 18, 2009

(54) APPARATUS, METHOD AND SYSTEM FOR IMPROVING NETWORK SECURITY

(75) Inventors: Shehzad T. Merchant, Mountain View, CA (US); Derek H. Pitcher, Los Altos, CA (US); Victor C. Lin, Fremont, CA (US); Manish M. Rathi, San Jose, CA (US); Jia-Ru Li, San Jose, CA (US); Matthew R. Peters, Santa Cruz, CA (US); Balaji Srinivasan, Fremont, CA (US); Vipin K. Jain, Santa Clara, CA (US); Amit K. Maitra, Cupertino, CA (US)

(73) Assignee: Extreme Networks, Santa Clara, CA (US)

( * ) Notice: Subject to any disclaimer, the term of this patent is extended or adjusted under 35 U.S.C. 154(b) by 547 days.

(21) Appl. No.: 10/773,394

(22) Filed: Feb. 6, 2004

(51) Int. Cl.
*G06F 11/30* (2006.01)
*H04M 1/66* (2006.01)

(52) U.S. Cl. .................. 726/26; 713/187; 709/223; 709/224; 709/225; 455/410

(58) Field of Classification Search ............. 713/201, 713/187; 709/223–225; 726/26; 455/410
See application file for complete search history.

(56) References Cited

U.S. PATENT DOCUMENTS

| | | | |
|---|---|---|---|
| 5,265,005 A * | 11/1993 | Schmidt et al. | 700/18 |
| 5,412,721 A * | 5/1995 | Rager et al. | 380/273 |
| 5,598,412 A | 1/1997 | Griffith et al. | |
| 5,659,604 A * | 8/1997 | Beckmann | 379/32.01 |
| 6,137,802 A * | 10/2000 | Jones et al. | 370/401 |
| 6,304,851 B1 | 10/2001 | Kmack et al. | |
| 6,363,489 B1 | 3/2002 | Comay et al. | |
| 6,400,925 B1 * | 6/2002 | Tirabassi et al. | 455/12.1 |
| 6,459,557 B1 | 10/2002 | Haensgen et al. | |
| 6,584,113 B1 | 6/2003 | Manduley et al. | |
| 6,654,588 B2 | 11/2003 | Moskowitz et al. | |
| 6,687,833 B1 | 2/2004 | Osborne et al. | |
| 6,766,453 B1 * | 7/2004 | Nessett et al. | 713/171 |
| 7,140,040 B2 | 11/2006 | McBrearty et al. | |

(Continued)

OTHER PUBLICATIONS

Funk Software, Inc., "Product News: RADIUS/AAA Solutions on Wireless Networks", Sep. 30, 2002, *available at*: http://web.archive.org/web/20040215160450/www.funk.com/radius/News/wireless.asp.

(Continued)

*Primary Examiner*—Minh Dieu Nguyen
(74) *Attorney, Agent, or Firm*—Howrey LLP

(57) ABSTRACT

Devices, systems and related methods are disclosed for improving operational security of a network and/or network devices, such as wireless access points (APs). In the disclosed systems, a network device is not fully operational until it is attached to a network and downloads sensitive information. The information is stored in the network device so that when the device is disconnected from the network, the sensitive information is erased from the device, making the device inoperative and removing sensitive information, such as passwords, network security keys, or the like. Disabling the network device in this manner not only prevents the theft of sensitive network access information, by also discourages theft of the device itself because it cannot be used on another network without the configuration information. In addition to downloading configuration information, the network device can also download an executable image that is likewise not permanently resident on the device.

19 Claims, 6 Drawing Sheets

U.S. PATENT DOCUMENTS

| | | | |
|---|---|---|---|
| 7,159,237 B2 | 1/2007 | Schneier et al. | |
| 7,181,530 B1 | 2/2007 | Halasz et al. | |
| 2001/0046224 A1* | 11/2001 | Ryu | 370/338 |
| 2002/0040389 A1* | 4/2002 | Gerba et al. | 709/219 |
| 2002/0066034 A1 | 5/2002 | Schlossberg et al. | |
| 2002/0197978 A1 | 12/2002 | Zavidniak | |
| 2003/0031188 A1* | 2/2003 | Ishibashi | 370/400 |
| 2003/0033413 A1 | 2/2003 | Willson et al. | |
| 2003/0046529 A1* | 3/2003 | Loison et al. | 713/2 |
| 2003/0058095 A1* | 3/2003 | Satoh | 340/509 |
| 2003/0065934 A1 | 4/2003 | Angelo et al. | |
| 2003/0105949 A1* | 6/2003 | Master et al. | 713/100 |
| 2003/0135762 A1 | 7/2003 | Macaulay | |
| 2003/0142641 A1* | 7/2003 | Sumner et al. | 370/328 |
| 2004/0125781 A1* | 7/2004 | Walter et al. | 370/338 |
| 2004/0252837 A1 | 12/2004 | Harvey et al. | |
| 2005/0114473 A1* | 5/2005 | Guy et al. | 709/220 |
| 2007/0064647 A1* | 3/2007 | Prasad | 370/331 |

OTHER PUBLICATIONS

Funk Software, Inc., "*Data Sheet: Steel-Belted Radius/Global Enterprise Edition*", Feb. 4, 2004, *avail. at*: http://web.archive.org/web/20040204113333/www.funk.com/radius/enterprise/gee_ds.asp.

Funk Software, Inc., "*Data Sheet: Steel-Belted Radius/GEE Appliance*", Feb. 4, 2004, *avail. at*: http://web.archive.org/web/20040204113816/www.funk.com/radius/enterprise/nei_gee_ds.asp.

Funk Software, Inc., "*White Paper: Centralized Remote Access Authentication with RADIUS*", Feb. 4, 2004, *avail. at*: http://web.archive.org/web/20040215054514/www.funk.com/radius/Solns/rad_wp.asp.

Funk, P. et al., "*EAP Tunneled TLS Authentication Protocol (EAP-TTLS)*", Mar. 2002, *avail. at*: http://www.ietf.org/proceedings/02mar/slides/eap-1/sld001.htm.

Blunk, L. et al., "*PPP Extensible Authentication Protocol (EAP)*", RFC 2284, Network Working Group, Mar. 1998, *avail. at*: http://www.faqs.org/rfcs/rfc2284.html.

Hussain, S., "*How to Convert Ether Type Packet to 802.11*", Apr. 18, 2002, *avail. at*: http://lists.linux-wlan.com/pipermail/linux-wlan-devel/2002-April/001036.html.

Zorn, G., "*Deriving Keys for Use With Microsoft Point-to-Point Encryption (MPPE)*", RFC 3079, Network Working Group, Mar. 2001, *avail. at*: http://www/faqs.org/rfcs/rfc3079.html.

Calhoun, P. et al., "*Extensible Authentication Protocol Support in RADIUS*", RFC 2138, RADIUS Working Group, May 8, 1998, *avail. at*: http:/www/freeradius.org/rfc/draft-ietf-radius-eap-05.txt.

Zorn, G., "*Microsoft Vendor-Specific RADIUS Attributes*", RFC 2548, Network Working Group, Mar. 1999, *avail. at*: http://www.faqs.org/rfcs/rfc2548.html.

Yongguang Zhang and Wenke Lee, "Intrusion Detection in Wireless Ad-Hoc Networks," ACM MOBICOM, 2000, pp. 275-283.

Sonali Bhargave and Dharma Agrawal, "Security Enhancements in AODV protocol for Wireless Ad Hoc Networks," IEEE 2001, pp. 2143-2147.

Nikita Borisov, Ian Goldberg, and David Wagner, "Intercepting Mobile Communications: The Insecurity of 802.11," 2001, pp. 1-13.

W. Arbaugh, N. Shanker, Y.C. Justin Wan, "Your 802.11 Wireless Network has No Clothes," Mar. 30, 2001, pp. 1-13.

* cited by examiner

| Bytes | | | |
|---|---|---|---|
| 0 | 1 | 2 | 3 |

| Offset | | | | |
|---|---|---|---|---|
| 0 | DA[0..3] | | | |
| 4 | DA[4..5] | | SA[0..1] | |
| 8 | DA[2..5] | | | |
| 12 | Length | | LLC | LLC |
| 16 | LLC | SNAP | | |
| 20 | Protocol ID | | Version | Reserved (0x0) |
| 24 | Length | | Checksum | |
| 28 | Sequence Number | | 0x0000 | |
| 32 | MAC Address[0..3] | | | |
| 36 | MAC Address[4..5] | | Payload | |
| 40 | Payload | | | |
| 44 | | | | |
| ⋮ | | | | |
| 4*N | | | | |

| Bytes | 0 | 1 | 2 | 3 |
|---|---|---|---|---|
| 0 | 0x99 | AP_Announce | Length ||
| 4 | Hardware ID[0..3] ||||
| 8 | Hardware ID[4..7] ||||
| 12 | Hardware ID[8..11] ||||
| 16 | Hardware ID[12..15] ||||
| 20 | HW Major Rev. | HW Minor Rev. | HW Build# ||
| 24 | Boot Major Rev. | Bootrom Minor Rev. | Bootrom Build# ||
| 28 | Serial number[0..3] ||||
| 32 | Serial number[4..7] ||||
| 36 | Serial number[8..9] || AP Ethernet MAC[0..1] ||
| 40 | AP Ethernet MAC[2..5] ||||
| 44 | HW_POST_STATUS ||||
| 48 | HW_POST_OK ||||

FIG. 6

| Bytes | 0 | 1 | 2 | 3 |
|---|---|---|---|---|
| 0 | 0x99 | Announce_Reply | Length ||
| 4 | AP IP Address ||||
| 8 | AP IP Mask | Use_VLAN_TAG | VLAN Tag ||
| 12 | Default Gateway ||||
| 16 | Switch IP Address ||||
| 20 | AgentX Port || Physical SW Port if_index ||
| 24 | Keep-Alive Period | Image Type | Reserved ||
| 28 | Boot URL ||||
| 32 | Boot URL ||||
| 36 | Boot URL ||||

|   | Bytes | | | |
|---|---|---|---|---|
|   | 0 | 1 | 2 | 3 |
| 0 | 0x99 | Renew_Config | Length | |
| 4 | AP IP Address | | | |
| 8 | AP IP Mask | Use_VLAN_TAG | VLAN Tag | |
| 12 | Default Gateway | | | |
| 16 | Switch IP Address | | | |
| 20 | AgentX Port | | Physical SW Port index | |
| 24 | Keep-Alive Period | Reserved 8 | Reserved 16 | |

*FIG. 7*

|   | Bytes | | | |
|---|---|---|---|---|
|   | 0 | 1 | 2 | 3 |
| 0 | 0x99 | TFTP_OK | Length | |
| 4 | Image Type | Status | Reserved | Retry # |

*FIG. 8*

|   | Bytes | | | |
|---|---|---|---|---|
|   | 0 | 1 | 2 | 3 |
| 0 | 0x99 | AP_Keep_Alive | Length | |

*FIG. 9*

|   | Bytes | | | |
|---|---|---|---|---|
|   | 0 | 1 | 2 | 3 |
| 0 | 0x99 | AP_Reset | Length | |

*FIG. 10*

APPARATUS, METHOD AND SYSTEM FOR IMPROVING NETWORK SECURITY

RELATED APPLICATIONS

This application is related to U.S. patent application Ser. No. 10/774,079, entitled "Method and System for Location-Based Access Control in a Computer Network;" U.S. patent application Ser. No. 10/773,487, entitled "Unified Adaptive Network Architecture." Each of the foregoing applications is filed concurrently herewith, and owned in common by assignee hereof. Moreover, each of these applications is fully incorporated by reference as set forth in full.

FIELD OF THE INVENTION

This invention generally relates to computer networks, and more specifically, to a computer network that includes features for improving network security by limiting the amount and type of information stored at network edge devices.

BACKGROUND OF THE INVENTION

Computer security, particularly network security, has become a significant concern in recent years. Network security protocols and procedures are generally designed to prevent unauthorized access to computer networks and the information stored on computers connected to the networks. Without security features in place, unauthorized users (frequently referred to as hackers) can access a network and steal or corrupt stored information and otherwise disrupt operation of the network. Such information theft is of particular concern on networks that provide access to sensitive information, e.g., those networks used in enterprise environments, such as corporations or government entities.

One way to gain unauthorized access to a computer network is to steal a network device. Network devices (i.e., computers and other electronic devices that communicate information over the network) often store information and data that are necessary to access the network. In particular, these devices often store image and configuration information in their local non-volatile memories (e.g., hard drives, EEPROM, non-volatile RAM, or the like). An image includes a software program that is executed by the device in order to access and operate on the network, and the configuration information is data that permits the device (or clients on or attached to the device) to access the network. These data can include security keys, such as encryption and/or authentication keys, user IDs, passwords, addresses, and the like.

Local storage of image and configuration information can lead to significant security compromises of the network. If the device is stolen, the thief will not only be able to use the device on another network, but will also have access to the sensitive configuration information, which will potentially permit unauthorized access to the network.

The theft of network devices is of particular concern in contemporary wireless networks that have access points (APs), such as those employing an IEEE 802.11 (Wi-Fi) protocol. APs are network edge devices that allow end users to wirelessly connect their computers or other personal devices to local area networks (LANs). APs are frequently deployed in open areas with full public access, making them susceptible to theft.

Accordingly, there is a need for an improved design and approach to managing network devices that not only deters their theft, but also reduces the risk of unauthorized network use.

SUMMARY

It is an advantage of the present invention to provide a network device, system and method for improving network security and deterring theft of network edge devices. The aforementioned objectives are accomplished by keeping sensitive information, such as executable images and configuration information, within the network itself, instead of permanently storing the images and information locally at network devices, such as APs.

In accordance with an embodiment of the invention, a network system includes a network component for storing sensitive information and a network device that is not fully operational until it is attached to the network and has downloaded the information. When downloaded, the sensitive information is stored in the network device so that when the device is disconnected from the network, the information is erased, making the device inoperative and removing the sensitive information, such as passwords, user IDs, network security keys, and the like. Disabling the network device in this manner not only prevents the theft of sensitive information, but also discourages theft of the device because it cannot be operated on another network without the information.

According to one aspect of the invention, the network device can include a bootstrap program for downloading an executable image. Like the configuration information, the executable image is also stored so that it is likewise erased when the device is disconnected from the network. The executable image is necessary for the device to operate on the network, and it also generates a request to the network. In response to the request, a server on the network downloads the configuration information to the device, where it is stored in the volatile memory and permits the device to become fully operational. In accordance with another embodiment of the invention, a network system includes a switch having at least one port for attaching a device so that information can be communicated between the device and the network system. The device is not fully operational when it is first connected to the port. The network system also includes application(s) and server(s) for downloading configuration information from the network to the device in response to a request from the device. The information is stored in a volatile memory in the device. The device becomes operable on the network after the configuration information is downloaded into the volatile memory.

In accordance with a further embodiment of the invention, a system includes a network and a network device. The network device includes a network interface, a memory whose contents are erased upon loss of power to the device, and a bootstrap program for downloading and storing an executable image in the memory. The device is not fully operational when it is first connected to the network. The network includes a switch having at least one port for connecting to the network interface so that information can be communicated between the device and the network. The network also includes server(s) and/or application(s) for downloading the executable image from the network into the memory in response to a request from the bootstrap program. The server(s) and application(s) also download configuration information from the network to the memory in response to a request generated by running the executable image on the network device. The network device becomes fully operational on the network after the configuration information is downloaded into its memory.

Method counterparts to these embodiments are also provided. Other embodiments, systems, methods, features and advantages of the invention will be or will become apparent to one with skill in the art upon examination of the following figures and detailed description. It is intended that all such additional embodiments, systems, methods, features and advantages be included within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 4-10 illustrate exemplary formats for messages sent between the edge devices and the LAN switch included in the system of FIG. 2.

DETAILED DESCRIPTION

Figure 1:
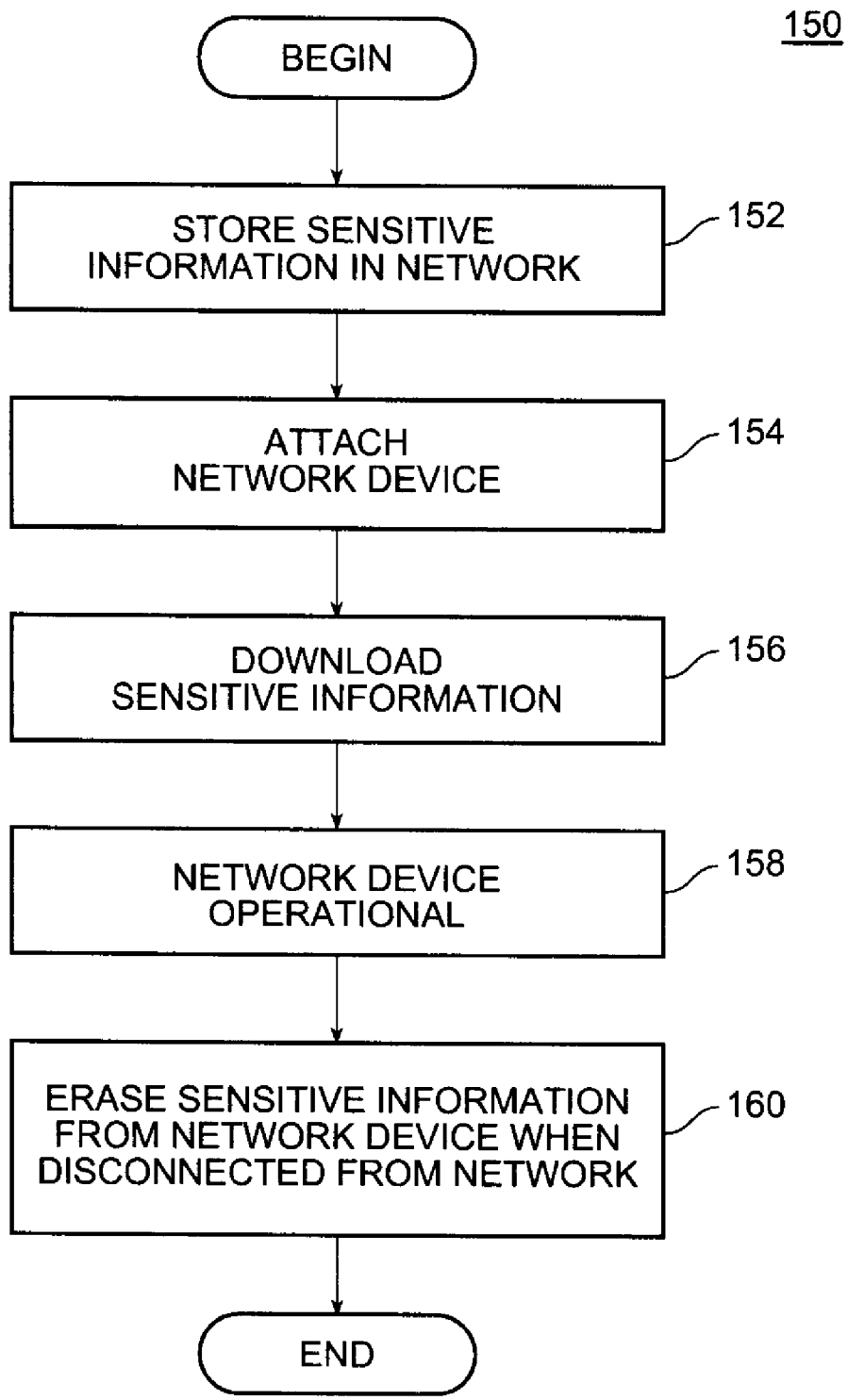
FIG. 1 is a flowchart showing a method of protecting network information and deterring theft of networked devices in accordance with an embodiment of the invention.

Turning now to the drawings, and in particular to FIG. 1, there is illustrated a flowchart 150 showing a method of protecting information in accordance with an embodiment of the invention. In step 152, sensitive network information, that is, information not generally available to the public and useful for accessing the network, e.g., configuration data and software images, are stored within a network. The information is stored on a network component, such as a switch, server or networked storage device, that is located in a secure environment of the network. The secure environment prevents unauthorized access to the network component. The secure environment can limit both physical access (e.g. the network component is placed in a locked room) and/or access by way of network communications (e.g., the network component is placed behind a firewall or other network security device).

In step 154, a network device is attached to the network. The network device can be any electronic device capable of communicating with the network. Generally, the network device can be placed in an unsecured environment, where it is susceptible to theft. For example, the network device is preferably a wireless AP. Prior to being attached to the network, the network device lacks the sensitive information stored on the network, and thus, cannot initially access all of the services provided by the network. Further, the network device is inoperative, at least in part, without the sensitive information.

In step 156, the sensitive information is downloaded to the network device when it is connected to the network. When downloaded, the information is stored in the network device so that when the device is disconnected from the network, the information is erased, making the device inoperative and removing the sensitive information, such as proprietary software, passwords, user IDs, network security keys, or the like. To accomplish this, the sensitive information is stored in a memory that is erased when the device is disconnected, or additionally/alternatively, when it loses power, for example, the information can be stored in a volatile memory (e.g. a dynamic RAM) included in the network device.

In a preferred embodiment, the network device is powered by the network cable using a conventional Power over Ethernet (PoE) scheme. With PoE, when the device is disconnected from the network, it, as well as its volatile memory loses power and the sensitive information is erased.

In step 158, the network device becomes operational. The network device is not fully operational until it is attached to the network and has downloaded the sensitive information. The sensitive information is installed and/or stored on the device so that the device becomes operational and can access the network.

In step 160, the network device is disconnected from the network. The sensitive information is erased from the network device when it is disconnected from the network. This causes the device to become inoperative, at least in part. Disabling the network device in this manner not only prevents the theft of sensitive information, but also discourages theft of the device because it cannot be operated on another network without the information.

Figure 2:
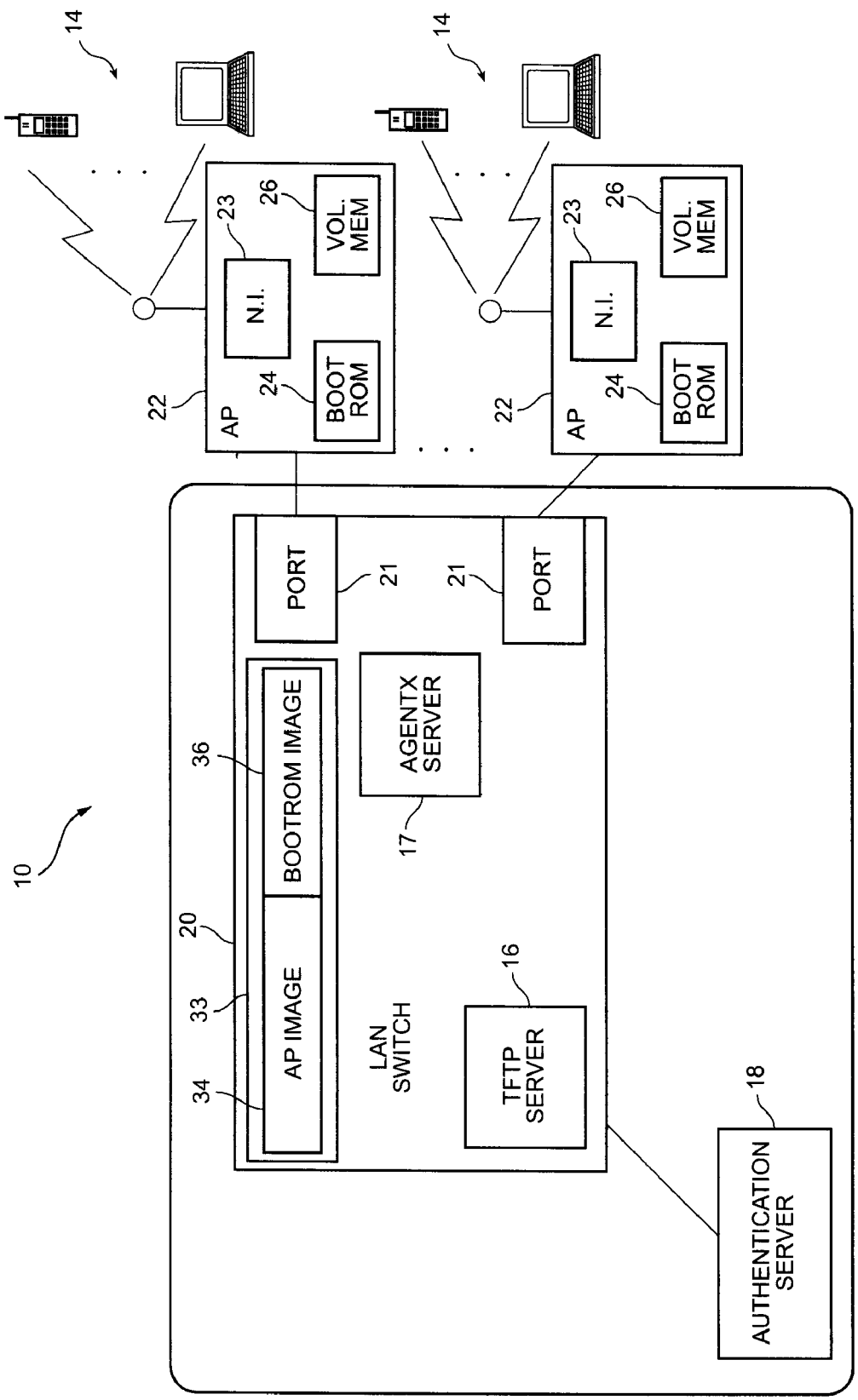
FIG. 2 is a block diagram of an exemplary network system in accordance with another embodiment of the present invention.

FIG. 2 shows an exemplary network system 10 in accordance with an embodiment of the present invention. The network system 10 protects sensitive information and deters edge device theft by keeping network configuration data and software within a network. Specifically, sensitive information resides in a switch 20 included in the network. The system 10 downloads the information to "dumb" edge devices 22 only when they are connected to the network. The edge devices 22 are dumb in the sense that they cannot fully operate on a network without the configuration data and software. The configuration data and software are erased from the edge devices 22 when they are disconnected from the network. By losing this operational data and software, the edge devices 22 essentially become inoperative and cannot be used interchangeably on other networks.

The network system 10 includes the network comprising at least a local area network (LAN) switch 20 connected to an authentication server 18. The system 10 also includes one or more network edge devices 22, such as wireless access points (APs) that are also connected to the LAN switch 20.

The network can also include other networking components (not shown), such as gateways, routers, additional servers hosting a variety of different applications, as well as links to other networks, such as an enterprise intranet or the public Internet.

The network components 18,20 can communicate with one another using any suitable access mechanism, such as SNMP, telnet, TCP/IP, HTTP or the like. Any suitable data network can be used to connect the components 18,20, such as a conventional Ethernet network.

The network switch 20 preferably communicates with the edge devices 22 over an Ethernet network.

The edge devices 22 can be any electronic network devices capable of communicating with the LAN switch 20 and including the features of the invention as described herein. The exemplary system 10 illustrates the devices 22 as being wireless APs. The edge devices 22 can also be wired devices that communicate with end user devices 14 over wired networks (not shown) instead of wireless channels.

Each edge device 22 includes a network interface (NI) 23, a boot ROM (read only memory) 24, and a volatile memory 26. The network interface 23 can be any suitable component for permitting network communication between the LAN switch 20 and the device 22, and is preferably a commercially-available Ethernet card. The boot ROM 24 can be any programmable ROM device, such as a flash or EEPROM (electrically erasable programmable read only memory), for storing a bootstrap program at the device 22. The volatile memory can be any suitable type of memory device that is erased when the device 22 is disconnected from the LAN switch 20. For example, the volatile memory 26 can be a dynamic random access memory (DRAM), which is erased when it loses power.

The edge device can also include a central processing unit (CPU) (not shown), such as a commercially-available microprocessor, for executing the bootstrap program as well as any software images and applications downloaded from the network 11. The CPU can be connected to boot ROM 24, memory 26, and NI 23. It can also control the NI 23.

Where the edge device 22 is a wireless AP, it can provide network access to one or more wireless end user devices 14, such as personal computers, laptops, PDAs, phones or the like. The end user devices 14 and the AP can communicate using a conventional wireless protocol, such as a WiFi protocol based on one of the IEEE 802.11 standards.

The user devices 14 can also be voice over IP phones that can have access to the network 11 via the edge devices 22. The voice over IP phones can be configured to download the images and configuration data from the switch 20 and through the edge devices 22. The voice over IP phones can store the configuration data and images in volatile memory so that when they are powered down or lose the signal from the edge devices 22, the configuration data and images are erased.

Before being connected to the LAN switch 20, the edge devices 22 are not fully functional. They lack a runtime device image (software) and configuration information that is required for them to be fully operational. This software and information is stored on the switch 20 in the network 11 and downloaded to the devices 22 when they are connected to the switch 20. This bootup procedure is described more fully below, in connection with FIG. 3.

The LAN switch 20 is a CPU-based network switch having interface cards, memory, and a real-time kernel and operating system (OS) for executing one or more software applications to support networked Ethernet communications and to perform in accordance with the various aspects of the invention disclosed herein. The real-time kernel and operating system (RTOS) can be VxWorks®, available from Wind River, Inc. of Alameda, Calif.

The LAN switch includes a conventional AgentX server 17, a trivial file transfer protocol (TFTP) server 16 and memory 33 for storing at least one access point (AP) software image 34, at least one AP bootrom image 36 and configuration data. The memory 33 storing the images 34,36 and data is preferably a conventional compact flash card, such as part no. W7B6064MIXG-T, available from Wintec.

The AP software images 34,36 and AP configuration data can be bundled with self-extracting switch software. During initialization of the switch 20, the bundled software can be loaded onto the switch 20. The bundled software can be compressed and wrapped so that it is self-extracting using a commercially-available software utility. When the bundled software is loaded onto the switch, the images 34,36 and configuration data are self-extracted and stored in the flash memory.

The compact flash memory has FAT16 file system structure on it. Thus, the AP image 34, AP bootrom 36, as well as other images and data can be stored as separate files on the compact flash file system. Using standard programming techniques, the flash file system can be registered with the VxWorks OS so that the files can be accessed by the OS and applications, such as the TFTP server 16, using standard OS calls.

The LAN switch 20 includes one or more ports 21 corresponding to each of the network devices 22. The ports 21 permit network communications between the devices 22 and the network 11. The LAN switch 20 can be a LAN access concentrator (LAC), i.e., it can be the network connection point for plural edge devices 22. All communications between the network 11 and the devices 22 pass through the switch 20.

The TFTP server 16 permits edge devices 22 to access images 34, 36. The images and data are downloaded to the edge devices 22 during the power on bootup sequence, as described in further detail below with reference to FIG. 3. The TFTP server 16 can also store other information. The TFTP server 16 is based on RFC 1350 and includes all features suggested in RFC2347.

On the switch 20, the TFTP server 16 operates as follows. The TFTP daemon task is started when switch 20 powers up. A TFTP task is created to process requests from the edge devices 22 and elsewhere. The server 16 supports multiple instances, i.e., one daemon listens on port 69, and new tasks are created to handle each incoming request. The tftpd PUT is achieved by reading bytes from the file descriptor and writing bytes to the INET UDP socket. The tftpd GET will read data from the socket and write to a file descriptor.

For TFTP opcodes field, the server 16 supports five opcodes:

| | |
|---|---|
| RRQ | read request |
| WRQ | write request |
| DATA | data packet |
| ACK | acknowledgement |
| ERROR | error code |

For the options field, the server 16 uses the default value as specified in RFC 2347.

The format field of the TFTP request is translated. Specifically, the TFTP client on the edge devices 22 sends netascii and octet. The available formats for TFTP are netascii, ascii, octet, binary, image. The server 16 and clients translate the formats as follows:

| | |
|---|---|
| "netascii" = | "netascii" |
| "ascii" = | "netascii" |
| "octet" = | "octet" |
| "binary" = | "octet" |
| "image" = | "octet" |

In an alternative architecture, the TFTP server 16 can be located elsewhere in the network 11, outside the LAN switch 20. Also, alternative protocols, other than TFTP, can be used to access and transfer the stored images. For example, BOOTP can be used as an alternative transfer mechanism for downloading the device images from the network 11 to the edge devices 22.

The switch 20 includes one or more applications for managing connections to the edge devices 22, as well as applications for downloading and updating edge device images and configuration information.

The switch 20 can be deployed in a secure wiring closet, which is not generally accessible to the public.

Any suitable network protocol can be used between the LAN switch 20 and the edge devices 22, such as a data packet scheme. Preferably Ethernet is used to communicate messages and information between the switch 20 and the devices 22.

The authentication server 18 can be a conventional RADIUS server that is configured to provide authentication services to the LAN switch 20. The server 18 can be used to authenticate an edge device 22 when it is first connected to the network 11, based on a device identifier stored in the device 22. The LAN switch 20 can include an authenticator operating in conformance with the IEEE 802.1x standard and can use the standard RADIUS protocol to transfer authentication requests and responses to and from the authentication server 18 via the switch 20. In addition, the server 18 can also authenticate end user devices 14 as they log onto the network 11. In an alternative architecture, the authentication server 18 can be included in the LAN switch 20 or located elsewhere in the network 11.

Figure 3:
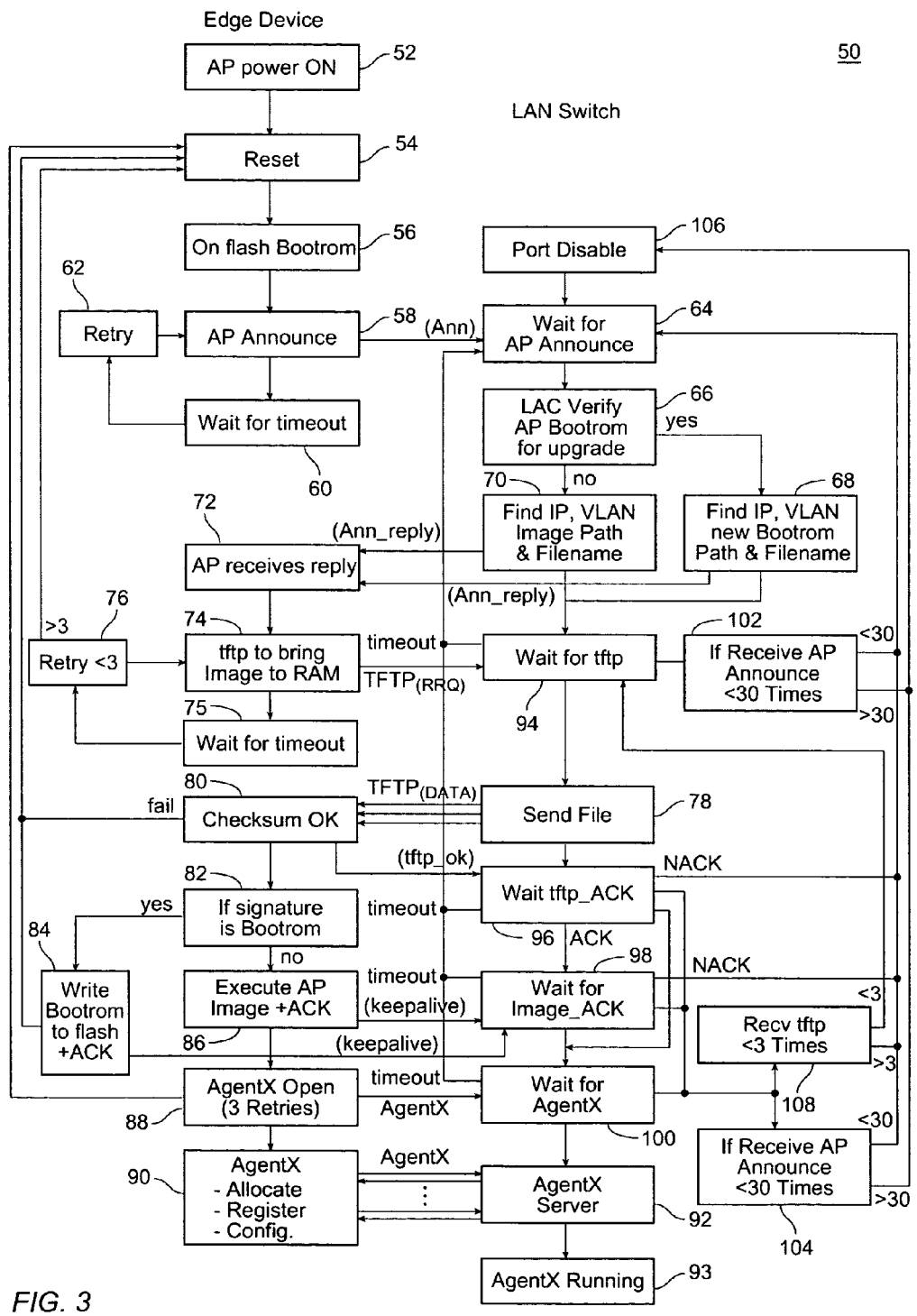
FIG. 3 is a message flow diagram showing an exemplary power-up sequence for an edge device included in the system of FIG. 2.

FIG. 3 is a message flow diagram 50 showing an exemplary power-up sequence for a dumb edge device 22 (e.g., an AP) included in the system 10 of FIG. 2. This bootup sequence illustrates an example method of protecting sensitive information by ensuring that it is only temporarily resident on the APs 22 while they are connected to the network 11.

In this bootup process, the AP 22 is first connected to a LAN switch 20 (e.g., a LAC) port using a network cable, such as a CAT-5 cable (step 52). Preferably, the AP 22 does not have an independent power source and takes power from the network cable using a convention scheme such as power over Ethernet (PoE). Using POE, the volatile memory 26, particularly any sensitive information contained therein, is erased when the AP 22 is disconnected from the switch 20. Upon receiving power, the AP 22 resets and starts its own bootup program that is stored in the boot ROM 24 (steps 54-56). When the AP 22 resets, its CPU points to a reset vector at the start of the bootup program. If the AP 22 ever loses power from network cable or connectivity from switch 20, it will restart the whole booting sequence again at the reset vector location.

While executing, the AP bootstrap program sends the AP Announce Message (FIG. 5) to the switch 20 (step 58) and waits for a response (step 60). If the response is not forthcoming, a retry will be used by the AP 22, if necessary, to avoid the loss of the Announce Message (step 62).

If authentication is successful, the switch 20 will decide the corresponding image(s) for the AP 22 to receive and send out an Announce Reply Message (FIG. 6).

Until it receives the Announce Message, the switch 20 waits (step 64). Upon receiving the Announce Message, the switch 20 determines whether a bootrom upgrade is necessary. (Step 66) If switch 20 determines that a bootrom upgrade is required from the contents of the Announce Message, the TFTP path and filename in the Reply Message is for the bootrom image (step 68), instead of the executable image (step 70). The switch 20 determines whether an upgrade is needed by comparing the bootrom version in the AP Announce Message with the version of the current bootrom program stored on the switch 20.

In the Announce Reply, the switch 20 delivers the switch IP address trivial file transfer protocol (TFTP) server identity, TFTP path/filename and other information that are needed for the AP 22 to download either the bootrom or AP image from the switch (step 72). The contents of this Reply message are discussed in more detail in connection with FIG. 6. The AP 22 then sends out the TFTP request (with retries, if necessary) to download the image and write it directly into AP's volatile memory 26 (e.g., DRAM) (steps 74-76). The TFTP request is encapsulated in the packet format shown in FIG. 4.

In response to the TFTP request, the switch 20 sends one or more TFTP data packets to the AP 22 containing the requested image (step 78) and then goes into a "Wait TFTP_ACK" state (step 96). The TFTP data packets are encapsulated in the packet format shown in FIG. 4.

The new bootrom image is initially downloaded into the AP DRAM 26 and its checksum is computed (step 80) by the AP 22. If the checksum fails, the AP 22 resets and the bootup sequence restarts.

The AP 22 can verify the checksum of the image received from the TFTP server and send out a TFTP_ACK (FIG. 8) back to switch 20. When the switch 20 receives the ACK, the switch 20 transits to the "Wait for Image_ACK" state (step 98).

Next, the signature in the header is tested to see if it is the signature of a bootrom image or AP image (step 82). If it is the bootrom image, the AP 22 writes the bootrom image from the DRAM into the flash ROM, sends an acknowledge (ACK) to the switch 20 and then resets itself to start the process over, using the newly installed bootrom image to download the executable image (step 84). The ACK to the switch 20 can be sent using a keepalive message that identifies the AP 22 (FIG. 9).

If the image is the AP image, the AP 22 executes the newly downloaded image from the DRAM and ACKs the switch 20 (step 86). The ACK to the switch 20 can be sent using a keepalive message that identifies the AP 22.

Among other things, the image installs an operating system (OS) including a TCP/IP stack and AgentX client on the AP 22. The image uses the IP address, gateway and virtual LAN (VLAN) information in the Announce Reply Message to ready the TCP/IP stack. After this step, TCP/IP stack is ready and the AgentX protocol (based on RFC 2741) is used to deliver the configuration information from the AgentX server 17 located on the switch 20 to the AP DRAM 26.

In response to receiving the bootrom or AP image ACK, the switch 20 transits to the "Wait for AgentX" state (step 100).

After the TCP/IP stack is stabilized, AgentX is used to download the configuration information. The AP 22 initiates the process by sending an AgentX.Open request to the AgentX server running on the switch 20 (step 88). The switch 20 follows up by sending an AgentX.open_reply (step 92). This initial message sequence is then followed by one or more transactions of AgentX.Allocate/AgentX.Allocate_Reply and AgentX.Register/AgentX.Register_Reply between the AP 22 and switch 20 to agree on supported configuration parameters. (steps 90, 93) Once the parameter set has been agreed on a series of AgentX.Set messages are used to download the configuration information to the AP 22.

To close the session between the AP and the switch the AgentX.Close message is used. It can be initialized by either the switch 20 or AP 22. The switch 20 includes a state machine that is intended to remain synchronized with the AP 22 and uses timeout mechanism for corner cases. As shown in FIG. 3, steps 94-100 rely on the timeout mechanism to return the switch 20 to step 64 in the event of an unresponsive AP 22.

In addition, the switch 20 uses a counter called "Recv AP Announce" to decide if the switch 20 has received too many Announce Messages, for example, over thirty, at certain points in the bootup sequence (steps 102-104). If the switch 20 receives too many AP Announce Messages before it completes the startup process, it disables the port (step 106). The counter will only incremented when switch 20 has time to process a request. When the switch 20 is highly loaded and does not have time to process Announce messages, incoming requests are collapsed and the counter is incremented once.

In a similar fashion, the switch 20 includes a counter called "Recv TFTP" to determine if the switch 20 has received too many TFTP requests from the AP 22 during the process (step 108).

In addition, the switch 20 can have timer between PoE up and the first AP Announce Message. If the switch 20 powers up the AP 22 and does not see the first Announce Message within a predetermined time period, it is assumed that there is something wrong with the AP 22 or the connection, and the switch 20 can power cycle the AP 22 again in an attempt to correct the situation.

The switch 20 configures the radio frequency (RF) profile of the AP 22 according to the IP address and gateway information specified in the Reply Message. (When the switch 20 receives the Announce Message, it replies with the Reply Message, which includes the IP settings). After the Renew_Config message is sent and the IP stack is reset the AP re-opens the AgentX session with the Switch 20. This includes sending the AgentX.Open, Alloc and Registration messages. In this case no AgentX.Set messages are sent, as configuration data has remained the same. FIGS. 4-9 illustrate exemplary formats for messages sent between the edge devices 22 and the switch 20 during the bootup procedure of FIG. 3. The messages are sent using Ethernet.

FIG. 4 shows the message format for encapsulating payload messages for transport between the AP 22 and switch over Ethernet. Each payload is encapsulated in an LLC+SNAP header. The header include source address (SA), destination address (DA), the LLC value, SNAP value, and protocol ID, version number, length, checksum, sequence number, and MAC address. The MAC address in the header is the sender's MAC address. The sequence number will be incremented by the sender for every packet sent.

FIGS. 5-9 show details of the message payloads carried in the packet format of FIG. 4 for the messages sent between the switch 20 and AP 22 during the bootup sequence discussed in connection with FIG. 3.

FIG. 5 shows an example of an AP Announce Message. The message contains the message length, AP hardware version (hardware ID, i.e., hardware major and minor revision IDs, and build number), bootrom image version (bootrom major and minor revision IDs, and build number), serial number, AP MAC address, hardware post status, and hardware post OK field. The hardware ID is a 16 byte ASCII string. The edge device can send this message every second, until Announce_Reply packet is returned by the LAN switch.

FIG. 6 shows an example of an Announce Reply Message. The message contains the IP address, subnet mask, default gateway and the management VLAN information on which the AP 22 should send the TFTP request. It also provides the "image_type" flag to identify whether the included URL is for the bootrom or AP image. The URL starts with "tftp://" and follows by the IP address of the TFTP server. The filename (or path name) follows. The fields are individually described as follows:

AP IP Address: IP address for the access point.
AP IP mask: mask for AP. For example, 24 means 255.255.255.0
AP default gateway Address: default gateway for the access point.
Switch IP Address: The LAN Switch IP to which the AP is connected.
AgentX port: After booting up, AP can start AgentX's TCP connection to this port.
Physical SW Port if index: The physical port number on LAN switch that AP is connected to. AgentX can report SNMP trap using this information.
USE_VLAN_TAG: 0: do not use VLAN tag, 1: use VLAN tag.
VLAN Tag: Insert the tag into packets if Use_VLAN_TAG is set to 1.
Keep-alive timer: Timer for AP_KEEP_ALIVE in seconds.
Image type: 0: Boot code, 1: AP runtime image.
Boot URL can be, e.g., tftp://10.0.0.1/Altitude-1.z. It can be a null terminated string.

FIG. 7 shows an example of a Renew_Config Message. The message contains a length, an AP IP address, AP IP mask, VLAN tag, default gateway, switch IP address, agentX port, and physical SW port index, and the other information shown for the AP 22 to use. If no IP is assigned, the current AP IP will be used. If the IP address is specified, then any AgentX connection is shut, the AP IP stack is re-initialized, and AgentX is re-established. Having a new IP in this message usual means that the management VLAN changes. Re-initializing the AP IP stack will move the AP to new management VLAN.

FIG. 8 shows an example of a TFTP_ACK Message. The message contains status information indicating that the TFTP transfer of the bootrom or AP image is complete. The fields are defined as follows:

Image type: 0—Boot ROM. 1—AP
Status: 0: OK, 1: Fail
Retry #: 1-3 number of the TFTP retries.

FIG. 9 shows an example of a keepalive message from the AP 22 to the switch 20. The packet includes information identifying the AP 22. In response to the packet, the switch 20 updates its internal state. The AP 22 sends outs a keepalive packet every second. If three packets are missed, or if different AP 22 is identified by the packet, i.e., one that the switch 20 does not already associated with the port 21, then switch 20 resets the AP 22.

FIG. 10 shows an example of a reset message sent from the switch 20 to the AP 22. This type of packet instructs the AP 22 to reset. In response to receiving this message, the AP 22 does a soft reset of all interfaces, and its internal software stacks. The message can be sent by an administrator. After the switch 20 sends the reset, it starts a watchdog timer to track the boot-up sequence as its starts over. In the other word, the switch 20 waits for the Announce message and reply with Announce_Reply message. However, if the timer goes off before an Announce message is received, the switch concludes that the AP 22 has not reset itself successfully, and the switch 20 then power cycles the AP 22 through PoE.

While various embodiments of the invention have been described, it will be apparent to those of ordinary skill in the art that many more embodiments and implementations are possible that are within the scope of this invention. For example, any combination of any of the systems or methods described in this disclosure are possible.

What is claimed is:

1. A system for protecting sensitive information in a network comprising:
   a network component for storing the sensitive information necessary for authorized network access;
   a network device, attachable to the network, that lacks the sensitive information necessary for authorized network access and is inoperative, at least in part, until the sensitive information is stored therein;
   wherein, when the network device is attached to the network, the sensitive information necessary for authorized network access is downloaded from the network component and stored in the network device so that the network device becomes operational;
   wherein, when the network device is disconnected from the network, the sensitive information necessary for authorized network access is erased from the network device, thereby making the network device inoperative at least in part and removing the sensitive information necessary for authorized network access from the network device;

wherein the network component is located in a secure environment comprising security for both physical access and network communications;

wherein the sensitive information necessary for authorized network access is selected from the group consisting of configuration information, a software image, and a combination of the forgoing; and wherein the sensitive information is bundled with self-extracting software as stored at the network component.

2. The system of claim 1, wherein the configuration information is selected from the group consisting of a password, a user ID, a network security key, and any combination of the forgoing.

3. The system of claim 1, wherein the network device includes a volatile memory for storing the sensitive information.

4. The system of claim 1, wherein the network component is a LAN switch comprising a server utilizing Simple Network Management Protocol (SNMP).

5. The system of claim 1, wherein the network device provides network access to a voice over IP phone, wherein the voice over IP phone stores configuration data and software images in volatile memory.

6. The system of claim 1, wherein the network device is powered by a network cable using Power over Ethernet (PoE).

7. A method for protecting sensitive information in a network comprising:

storing the sensitive information necessary for authorized network access at a network component;

attaching a network device to the network, the network device lacking the sensitive information necessary for authorized network access and being inoperative, at least in part, until the sensitive information necessary for authorized network access is stored therein;

downloading the sensitive information necessary for authorized network access from the network component to the network device;

storing the sensitive information necessary for authorized network access in the network device so that the network device becomes operational on the network;

when the network device is disconnected from the network, erasing the sensitive information necessary for authorized network access from the network device, thereby rendering the network device inoperative, at least in part;

wherein the network component is located in a secure environment comprising security for both physical access and network communications;

wherein the sensitive information necessary for authorized network access is selected from the group consisting of configuration information, a software image, and a combination of the forgoing; and wherein the sensitive information is bundled with self-extracting software as stored at the network component.

8. The method of claim 7, wherein the configuration information is selected from the group consisting of a password, a user ID, a network security key, and any combination of the forgoing.

9. The method of claim 7 wherein the network device includes a volatile memory for storing the sensitive information necessary for authorized network access.

10. The method of claim 7, wherein the network component is a LAN switch comprising a server utilizing Simple Network Management Protocol (SNMP).

11. The method of claim 7, wherein the network device provides network access to a voice over IP phone, wherein the voice over IP phone stores configuration data and software images in volatile memory.

12. The method of claim 7, wherein the network device is powered by a network cable using Power over Ethernet (PoE).

13. A device that is non-operational on a network unless the device is storing configuration information necessary for authorized network access comprising:

an interface for communicating with the network;

a memory whose contents are erased upon loss of power to the device;

means for downloading from a network component of the network and storing in the memory the configuration information necessary for authorized network access so that the configuration information necessary for authorized network access is not retained when the device is powered down, wherein the configuration information necessary for authorized network access, when stored in the memory, permits the device to operate on the network;

wherein the device is a wireless access point (AP);

wherein the network component is located in a secure environment comprising security for both physical access and network communications;

wherein the means for downloading includes a bootstrap program for downloading from the network an executable image;

wherein the executable image permits the device to download the configuration information necessary for authorized network access;

wherein the configuration information necessary for authorized network access includes security information for allowing end user devices to access the network through the wireless AP; and wherein the device provides network access to a voice over IP phone that stores the security information and a software image in volatile memory.

14. The device of claim 13, further comprising means for storing the executable image in the memory.

15. The device of claim 13, wherein the configuration information necessary for authorized network access includes security information for allowing the device access to the network.

16. A network system, comprising:

a switch for attaching a device to a network so that information can be communicated between the device and the network system, wherein the device is not fully operational when first connected to the switch; and means for downloading configuration information necessary for authorized network access from a network component of the network system to a volatile memory included in the device in response to a request from the device, so that the configuration information necessary for authorized network access is not retained in the device when the device is powered down, the device being operable on the network after the configuration information necessary for authorized network access is downloaded into the volatile memory;

means for downloading an executable image from the network system to the device;

wherein the request is generated by running the executable image on the device;

wherein the device is a wireless access point (AP);

wherein the network component is located in a secure environment comprising security for both physical access and network communications;

wherein the configuration information necessary for authorized network access includes security information for allowing end user devices to access the network system through a wireless AP; and wherein the device provides network access to a voice over IP phone that stores the security information and a software image in volatile memory.

17. The network system of claim 16, wherein the device is powered by a network cable using Power over Ethernet (PoE).

18. The network system of claim 16, wherein the configuration information necessary for authorized network access includes security information for allowing the device access to the network.

19. The network system of claim 16, further comprising means for authenticating the device on the network.

* * * * *